United States Patent [19]

Ito et al.

[11] Patent Number: 4,732,823
[45] Date of Patent: Mar. 22, 1988

[54] ELECTROLYTE FLOWING CONSTRUCTION FOR ELECTROLYTE CIRCULATION-TYPE CELL STACK SECONDARY BATTERY

[75] Inventors: Hiromichi Ito; Takafumi Hashimoto, both of Tokyo, Japan

[73] Assignee: Kabushiki Kaisha Meidensha, Tokyo, Japan

[21] Appl. No.: 804,433

[22] Filed: Dec. 4, 1985

[30] Foreign Application Priority Data

Dec. 10, 1984 [JP] Japan ............................ 59-186117[U]

[51] Int. Cl.$^4$ ............................................ H01M 10/38
[52] U.S. Cl. ...................................... 429/72; 429/101; 429/105; 429/34
[58] Field of Search ................. 429/72, 101, 105, 34, 429/38, 39, 14, 88, 51

[56] References Cited

U.S. PATENT DOCUMENTS

| | | | |
|---|---|---|---|
| 3,717,505 | 2/1973 | Unkle, Jr. et al. | 429/27 |
| 3,772,085 | 11/1973 | Bjorkman | 429/15 |
| 3,814,631 | 6/1974 | Warszawski et al. | 429/39 |
| 3,940,283 | 2/1976 | Symons | 429/81 |
| 4,346,150 | 8/1982 | Bellows et al. | 429/34 |
| 4,403,018 | 9/1983 | Alfenaar et al. | 429/39 X |
| 4,421,831 | 12/1983 | Garcia, Jr. | 429/70 |
| 4,461,817 | 7/1984 | Itoh et al. | 429/209 |
| 4,590,135 | 5/1986 | Warszawski et al. | 429/38 |

FOREIGN PATENT DOCUMENTS

| | | |
|---|---|---|
| 1429192 | 4/1965 | France . |
| 2125159 | 9/1972 | France . |
| 57-115772 | 7/1982 | Japan . |
| 58-103779 | 6/1983 | Japan . |
| 482313 | 11/1969 | Switzerland . |

Primary Examiner—Anthony Skapars
Attorney, Agent, or Firm—Fleit, Jacobson, Cohn & Price

[57] ABSTRACT

In an electrolyte flowing construction for an electrolyte circulation-type cell stack secondary battery composed of a plurality of unit cells of the type in which two channels and two microchannels are respectively formed in two pairs on opposite side portions of a frame member of an electrode or separator such that an electrolyte entering through one of the manifolds connected to one of the channels is directed into a central portion of the electrode surface therethrough and then flowed out through the other manifold connected to the other channel, the microchannels are respectively formed in the vertical side portions. Also, each of the microchannels includes a long wall-shaped projection extended vertically from a connecting portion between it and the associated channel.

4 Claims, 3 Drawing Figures

ELECTROLYTE FLOWING CONSTRUCTION FOR ELECTROLYTE CIRCULATION-TYPE CELL STACK SECONDARY BATTERY

BACKGROUND OF THE INVENTION

The present invention relates to improvements in and relating to the construction of a metal-halogen (e.g. $ZnBr_2$) electrolyte circulation-type cell stack secondary battery and more particularly to a cell stack secondary battery of the type in which the installation locations of a pair of micro-channels formed in the frame member of each framed electrode means or separating means for making uniform the flow of an electrolyte are selected on the right and left sides of the frame member thereby further stabilizing the flow of the electrolyte.

A typical example of the conventional metal-halogen electrolyte circulation-type cell stack secondary battery is disclosed in the specification of U.S. Pat. No. 4,461,817 assigned to the same assignee as the present application. The disclosed zinc-bromine secondary battery comprises, as a basic component unit of the secondary battery cell stack, a unit cell divided into a positive electrode chamber and a negative electrode chamber by an ion-permeable micro-porous membrane (separator), a positive electrode arranged in the positive electrode chamber and a negative electrode arranged in the negative electrode chamber. A positive electrolyte is circulated from a positive electrolyte storage tank through the positive electrode chamber by a positive pump and a negative electrolyte is circulated from a negative electrolyte storage tank through the negative elect chamber by a negative pump. With the two electrolytes being circulated in the described manner, during the charge the reactions of the following formulas take place:

At the negative electrode: $Zn^{++} + 2e \rightarrow Zn$
At the positive electrode: $2Br^- \rightarrow Br_2 + 2e$ In this case, bromine molecules ($Br_2$) are produced at the positive electrode and mixed in the positive electrolyte. While a part of these molecules is dissolved in the positive electrolyte, the greater part is converted to a bromine complex compound by the bromine complexing agent in the positive electrolyte and the resulting complex compound is precipitated and stored in the positive electrolyte storage tank. During the discharge, with the electrolytes being circulated as mentioned previously, the reactions reverse to the previously mentioned formulas take place at the negative and positive electrodes and electric energy is discharged to an external load from the electrodes.

Where this zinc-bromine secondary battery is used for electric power storage purposes, for example, the electric power load leveling by storing with surplus electric power in nighttime and by discharging the stored electric power in daytime or as a power source for electric motor vehicles, generally an interruption period of at least more than eight hours is provided before starting the next discharge after the charge. During the interruption period, in order to prevent any self-discharge due to the diffusion of the dissolved $Br_2$ in the positive electrolyte from the positive electrode chamber to the negative electrode chamber through the separator, it is necessary to flow out the positive and negative electrolytes from the respective battery cells (the positive and negative electrode chambers) to the respective electrolyte storage tanks and introduce a substituting air into the respective cells.

As a result, the substituted air in the cell must be exhausted before the discharge and thus it is necessary to utilize for example gravity so that in the battery service position the positive and negative electrolytes are gradually filled into the cell upward from the below and the light air is exhausted from the upper manifolds to the outside of the cell.

On the other hand, during the discharge $Zn^{++}$ ions are produced on the negative electrode by a reaction of $Zn \rightarrow Zn^{++} + 2e$ and these $Zn^{++}$ ions in the negative electrolyte are high in concentration thus tending to sediment in the negative electrode chamber. Therefore, the $Zn^{++}$ ions must immediately be flowed out to the outside of the negative electrode chamber and for this purpose it is necessary to arrange so that in the battery service position the electrolyte is caused to flow upward from the below at an increased flow velocity or the electrolyte is caused to flow downward from the above. On the other hand, during the charge $Br_2$ is produced on the positive electrode by a reaction of $2Br^- \rightarrow Br_2 + 2e$ and this $Br_2$ in the positive electrolyte also tends to sediment in the positive electrode chamber. Thus, in order to flow out such $Br_2$ to the outside of the positive electrode chamber or to supply such $Br_2$ uniformly onto the lower surface of the positive electrode during the discharge, it is necessary to cause the electrolyte to flow downward from the above in the positive electrode chamber and thereby prevent the sedimentation of $Br_2$.

As a result, when exhausting the substitute air in the cell by the positive and negative electrolytes prior to the discharge, the flow directions of the electrolytes must be reversed from those during the charge and discharge and for this purpose it is necessary to reverse the directions of rotation of the positive and negative pumps or arrange a four-way cock for reversing the flow directions of the electrolytes within the circulation loops.

SUMMARY OF THE INVENTION

It is the primary object of the present invention to provide a metal-halogen electrolyte circulation-type cell stack secondary battery which is operated so that the direction of electrolyte flow is maintained in a predetermined direction at all times including during the charge, discharge, interruption and exhausting of the substituted air in the cell by the electrolytes thereby avoiding any complication of the construction due to the provision of reversible pumps or a four-way cock and eliminating the time and labor required for the operation thereof.

In the cell stack secondary battery disclosed in the previously mentioned U.S. Pat. No. 4,461,817, as will be seen from its FIG. 3, a bipolar-type electrode frame member defining a positive electrode chamber and a negative electrode chamber of each cell is formed on each of its top and bottom sides with a channel communicated with an electrolyte inlet or outlet manifold and a microchannel comprising a plurality of projections arranged in the flow path of an electrolyte entering from one of the channels or flowing out through the other so as to uniformly spread the electrolyte into the positive or negative electrode chamber.

On the contrary, in accordance with one aspect of the invention, the microchannels are respectively provided on the vertical sides (right and left sides) of each frame member. The horizontal sides (top and bottom sides) of the frame member are each provided with the channel communicating with the electrolyte inlet or outlet manifold so that one of the channels is communicated with one of the microchannels and the other channel is communicated with the other microchannel. Also, each microchannel includes a long wall-shaped projection having a suitable length and extended vertically from the connecting portion between it and the associated channel.

In accordance with the invention, by virtue of the fact that the microchannels provided in the frame member of each electrode or separator are respectively located on the vertical sides of the frame member and that each of the microchannels includes the long wall-shaped and vertically extended projection, there is the effect of eliminating the operation of reversing the flow directions of the positive and negative electrolytes which reversing operation has been unavoidable with the conventional battery, with the result that the positive and negative electrolytes flow in the same direction within the cell when the electrolytes are supplied into the cell and during the battery operation of the charge and discharge, respectively, and there is no need to reverse the directions of flow of the electrolytes by such operation as operating the cock in the external piping or reversing the directions of rotation of positive and negative the pumps thereby ensuring smooth movement of Zn ions and $Br_2$ in response to the flow of the electrolytes during the operation.

The above and other objects as well as advantageous features of the invention will become more clear from the following description taken in conjunction with the drawings.

DESCRIPTION OF THE PREFERRED EMBODIMENTS

Figure 1:
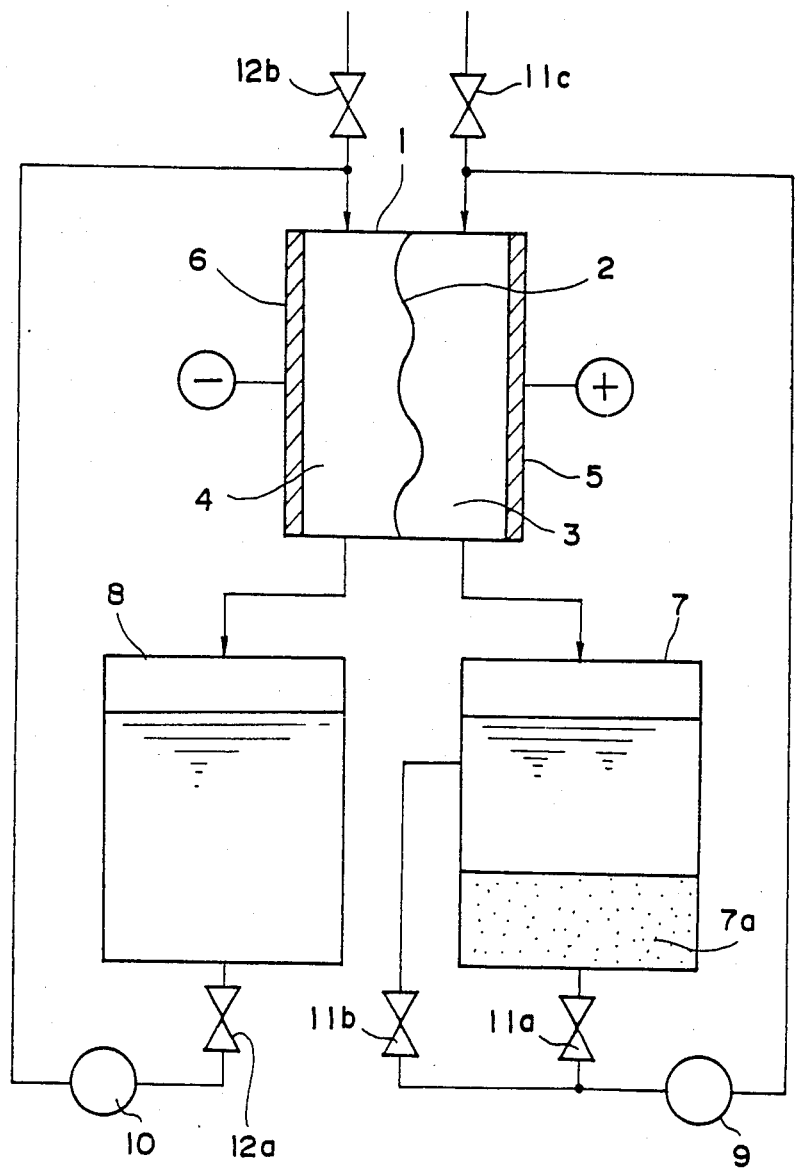
FIG. 1 shows the basic construction of a unit cell used in a cell stack secondary battery according to the invention.

Generally, a metal-halogen cell, e.g., zinc-bromine cell of the cell stack secondary battery according to this invention is basically constructed as shown in FIG. 1. The cell comprises a unit cell 1 divided by an ion-permeable micro-porous membrane (separator) 2 into a positive electrode chamber 3 and a negative-electrode chamber 4, a positive electrode 5 positioned in the positive electrode chamber 3 and a negative electrode 6 positioned in the negative electrode chamber 4. A positive electrolyte is circulated through the positive electrode chamber 3 from a positive electrolyte storage tank 7 by a positive pump 9 and a negative electroplyte is circulated through the negative electrode chamber 4 from a negative electrolyte storage tank 8 by a negative pump 10. Numerals 11a, 11b and 12b designate valves adapted open during the charging and discharging, respectively, to circulate the electrolytes. During the charging, the valves 12a and 11b are opened and a bromine complex compound 7a is precipitated in the positive electrolyte storage tank 7. During the discharging, the valves 12a and 11a are opened and positive electrolyte which includes the bromine complex compound 7a is circulated. Numerals 11c and 12b designate valves adapted to open when a substitution air is introduced or exhausted.

Figure 2:
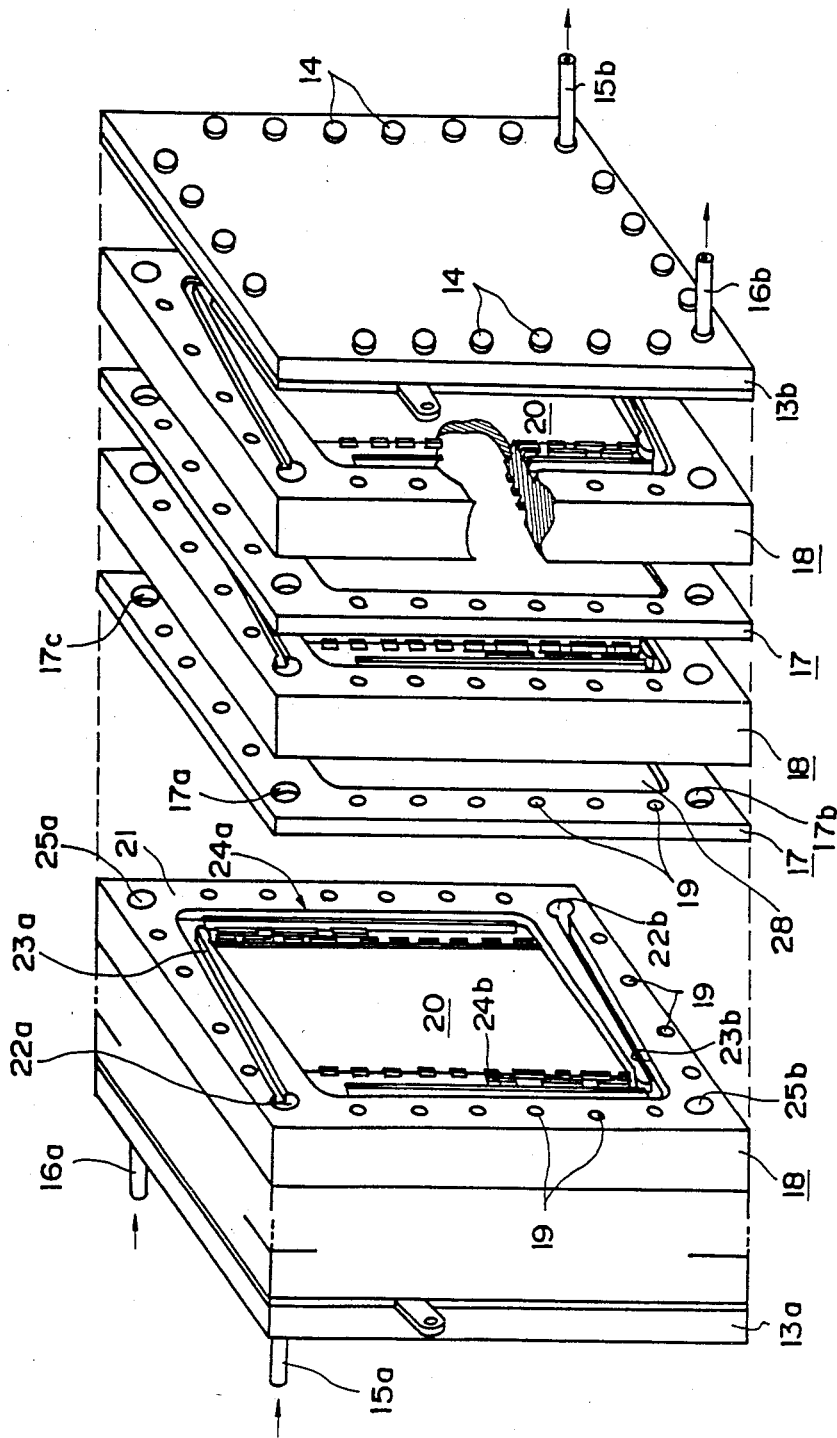
FIG. 2 is an exploded perspective view showing an embodiment of the invention applied to a bipolar-type cell stack construction comprising a plurality of such cells as shown in FIG. 1.

Practically, a bipolar type of cell stack battery comprising a stack of unit cells of the type shown in FIG. 1 has been in use. FIG. 2 is an exploded perspective view showing an embodiment of the bipolar type of cell stack battery according to the invention.

As will be seen from FIG. 2, the bipolar type of cell stack battery is constructed by alternately stacking a plurality of separating means 17 each having a separator 28 and a plurality of electrode means 18 each having a positive and negative electrode member 20, arranging terminal boards 13a and 13b on both sides of the stack and inserting a bolt 14 through each of bolt holes 19 formed in the respective means thereby holding all the means together as an integral assembly. The terminal board 13a is formed with a positive electrolyte inlet 15a and a negative electrolyte inlet 16a and the other terminal board 13b is formed with a positive electrolyte outlet 15b and a negative electrolyte outlet 16b. Now referring only to the flowing path of the positive electrolyte, the positive electrolyte supplied from the positive electrolyte inlet 15a passing through a manifold 22a formed in each electrode means 18 and a manifold 17a formed in each separating means 17, is introduced into a microchannel 24a of its frame member 21 through a channel 23a, rectified and then supplied to the positive electrode surface of the electrode member 20. Then, the positive electrolyte flows to the positive electrolyte outlet 15b through a microchannel 24b, a channel 23b and a manifold 22b on the outlet side of each electrode means 18 and a manifold (not shown) of each separating means 17 and is returned to the electrolyte storage tank through the outlet 15b. The negative electrolyte flows out from the negative electrolyte outlet 16b through another flowing path similarly from the negative electrolyte inlet 16a through the negative electrode side of the respective electrode members 20.

Figure 3:
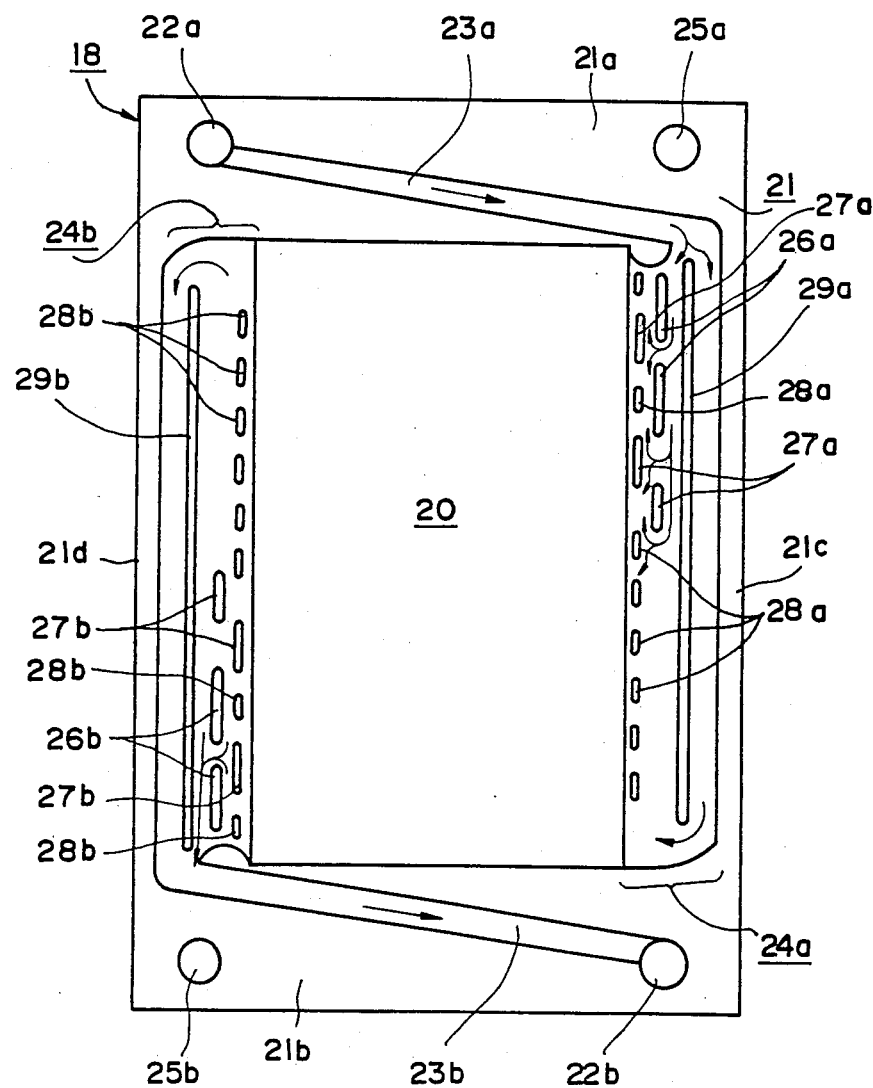
FIG. 3 is a plan view showing an embodiment of the electrode or separator frame member used in the secondary battery according to the invention.

FIG. 3 illustrates a plan view of the electrode means 18 shown in FIG. 2. The bolt holes are not shown. In the Figure, the electrode means 18 includes the frame member 21 and the electrode member 20 which is enclosed by the frame member 21 and depressed as compared with the surface of the frame member 21. The frame member 21 includes top and bottom sides 21a and 21b and right and left sides 21c and 21d. The manifold 22a and the channel 23a are located on the top side 21a and the manifold 22b and the channel 23b are located on the bottom side 21b. Also, the microchannel 24a is located vertically along the longitudinal direction of the right side 21c and the other microchannel 24b is located vertically along the longitudinal direction of the left side 21c. The microchannels 24a and 24b respectively include long wall-shaped projections 29a and 29b which vertically extend from the connecting portions between them and the channels 23a and 23b, respectively. As regards the remaining microchannel constructions themselves, they comprise hindrance portions including short straight wallshaped projections 26a, 26b, 27a, 27b, and 28a, 28b, of three different lengths, which are similar but are simpler in shape and easier to make than those disclosed in the previously mentioned U.S. Pat. No. 4,461,817. Of these components, the vertical length of the respective projections 26a and 26b is longer than that of the respective projections 27a and 27b and they are arranged in a staggered manner in the adjoining areas to the channels 23a and 23b. The vertical length of the respective projections 28a and 28b is shorter than that of the respective projections 27a and 27b, and the projections 28a and 28b are mainly arranged on the opposite side areas to the above mentioned adjoining areas to the channels. Also, the projections 26a, 27a, 28a and 26b, 27b, 28b are respectively arranged substantially parallel to the long wall-shaped projection 29a and 29b and zigzag diversion flow paths of the electrolyte are provided by these projections. Also, all the projections 26a, 26b, 27a, 27b, 28a, 28b and 29a, 29b are of the same height with the frame member 21. It is to be noted that forward ends of the long wall-shaped projections 29a and 29b may be extended to enter the channels 23a and 23b, respectively. While FIG. 3 shows only one surface of the electrode means 18, the same structure of another electrode means is formed on the back surface in a symmetrical manner against the vertical center axis with that on the front surface, and numerals 25a and 25b designate manifolds communicating with the associated channels on the back surface. In other words, if the front surface side is the positive electrode chamber, then the back surface side is adopted as the negative electrode chamber. The manifold 25a is communicated with the negative electrolyte inlet 16a and the manifold 25b is communicated with the negative electrolyte outlet 16b.

Next, a description will be made of the electrolyte flows in each electrode chamber of a secondary battery comprising a plurality of the electrode means 18 of the construction shown in FIG. 3. In FIG. 3, the electrolyte introduced under a constant pressure through the left upper manifold 22a flows down through the channel 23a and it is divided by the forward end of the long wall-shaped projection 29a into two flowing parts as shown by the arrows in the figure. The two flowing parts of the electrolyte respectively flow onto a surface of the electrode member 20. One of the two flowing parts flows gradually along the inner wall side of the long wall-shaped projection 29a, is repeatedly divided into flowing parts along the rows of the straight wall-shaped projections 26a, the shorter wall-shaped projections 27a and the shortest wall shaped projections 28a. The other flowing part flows down along the outer wall side of the long wall-shaped projection 29a and after passing around the backward end of the long wall-shaped projection 29a it is introduced at a given pressure corresponding to the inflow pressure onto the center surface portion of the electrode member 20. The electrolyte thus passing through the surface portion of the electrode member 20 reaches the microchannel 24b on the left side of FIG. 3, from which the electrolyte flows down to the forward end (i.e. lower end in FIG. 3) of the left-side long wall-shaped projection 29b as shown by the arrow, passes through the lower channel 23b and then flows out to the outside of the electrode chamber through the lower right manifold 22b. At this time, the air existing in the electrode chamber of the cell flows downward along the outer wall side of the left-side long wall-shaped projection 29b from its upper end to its lower end so that while being engulfed into the outflowing electrolyte, the air flows into the channel 23b and it is then exhausted to the outside of the electrode chamber through the manifold 22b.

Also, during the charge and discharge, $Zn^{++}$ ions produced at the negative electrode or $Br_2$ molecules produced at the positive electrode flow, along with the electrolyte flowing in the given direction, toward the lower end of the left-side long wall-shaped projection 29b and they are flowed out, along with the electrolyte, to the outside of the electrode chamber.

While, in the embodiment described above, the frame member 21 of each electrode means 18 is formed with the required channels and microchannels, it is of course possible to alternatively form these channels and microchannels in the frame member of each separating means 17 and both of them fall within the scope of the invention.

What is claimed is:

1. A metal-halogen electroyte circulation-type cell stack secondary battery comprising a plurality of electrode means each having an electrode member enclosed by a first frame member, a plurality of separating means each having a separator member enclosed by a second frame member, said electrode means and said separating means being alternately stacked in a manner that a positive electrode chamber and a negative electrode chamber are provided respectively on both sides of each of said separator members, positive electrolyte circulating first manifold means and negative electrolyte circulating second manifold means formed in each of said first and second frame members therethrough, and first and second channel means and first and second microchannel means formed in the opposite surfaces of at least one of said first and second frame members on the side of each of said positive electrode chamber and said negative electrode chambers, respectively, said first and second channel means communicating with said first or second manifold means and said first and second microchannel means respectively communicating said first and second channel means with an interior of each said positive or negative electrode chamber to hinder an electrolyte flowing therethrough, said positive and negative electrolytes flowing out from the positive and negative electrode chambers and substituted by air after the charging of the battery, said first and second microchannel means being respectively arranged on vertical side portions of each said at least one frame member, said first microchannel means being provided with a long wall-shaped projection extending from its connecting portion to said channel means along one of said verticle side portions to form a pair of inlet paths at forward and rearward ends thereof and a plurality of short wall-shaped projections located closely in said forward and rearward inlet paths, the electrolyte introduced to said first microchannel means being divided by a forward end of said long wall-shaped projection into two flowing parts, said second microchannel means being located symmetrically against a center point of a surface of said electrode member with said first microchannel means.

2. A secondary battery according to claim 1 wherein said first frame member includes symmetrical structures on front and back surfaces thereof.

3. A secondary battery according to claim 1, wherein said second frame member includes symmetrical structures on front and back surfaces thereof.

4. A secondary battery according to claim 1, wherein each of said first and second manifold means includes an inlet manifold and an outlet manifold which are respectively formed in horizontal side portions of each of said first and second frame members.

* * * * *